A. AND G. WOOD.
CLOTH AND LIKE GUIDER OR FEEDER.
APPLICATION FILED JUNE 19, 1922.

1,434,179.

Patented Oct. 31, 1922.
3 SHEETS—SHEET 1.

Inventors:
Abraham Wood.
Granville Wood.
By their Attorney: Walter Gunn

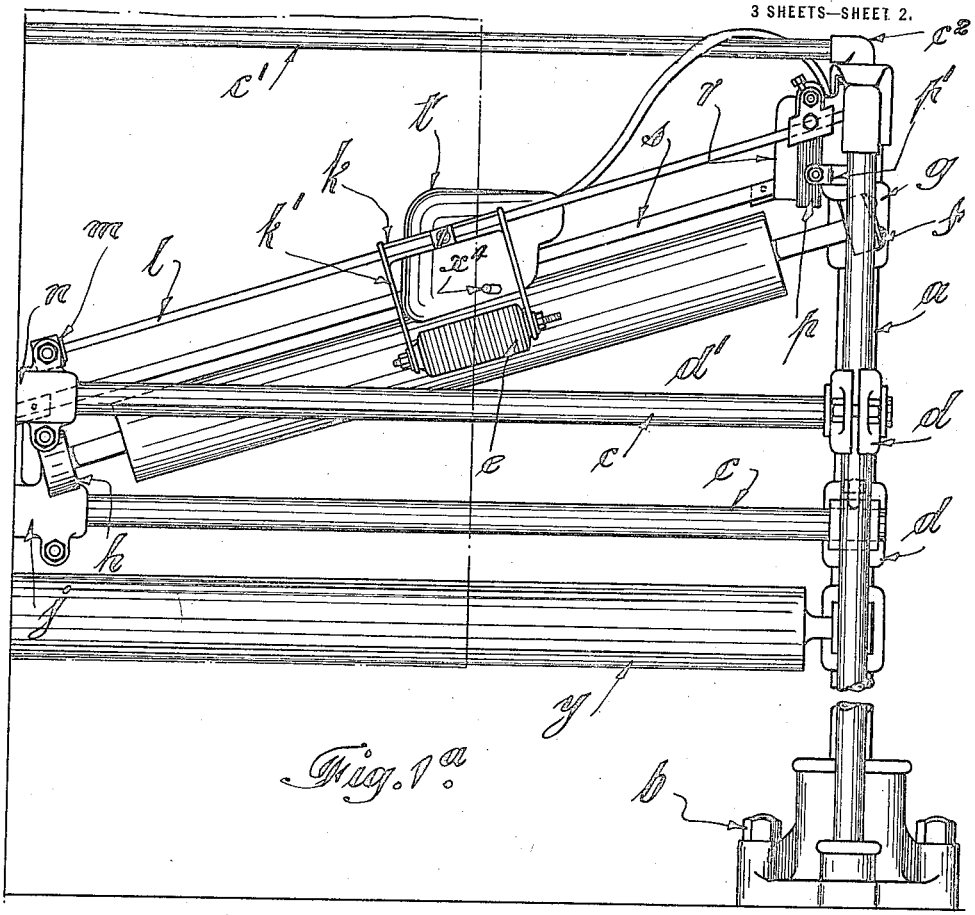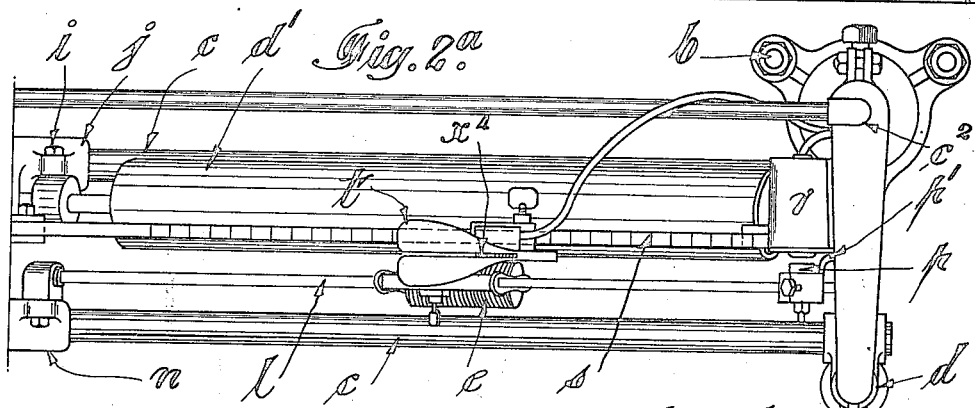

A. AND G. WOOD.
CLOTH AND LIKE GUIDER OR FEEDER.
APPLICATION FILED JUNE 19, 1922.

1,434,179.

Patented Oct. 31, 1922.
3 SHEETS—SHEET 3.

Inventors:
Abraham Wood.
Granville Wood.
By their Attorney:— Walter Gunn

Patented Oct. 31, 1922.

1,434,179

UNITED STATES PATENT OFFICE.

ABRAHAM WOOD AND GRANVILLE WOOD, OF STUBBINS, NEAR MANCHESTER, ENGLAND.

CLOTH AND LIKE GUIDER OR FEEDER.

Application filed June 19, 1922. Serial No. 569,552.

*To all whom it may concern:*

Be it known that we, ABRAHAM WOOD and GRANVILLE WOOD, both subjects of the King of Great Britain and Ireland, residing at Stubbins, near Manchester, England, have invented new and useful Improvements in Cloth and like Guiders or Feeders, of which the following is a specification.

This invention refers to apparatus commonly known as automatic guiders for guiding cloth and the like, also opening and straightening the same, as it is delivered to machines of various kinds, notably, calenders, mangles, stretchers, beetles and stenters.

The object of the invention is to provide automatic guiding apparatus which primarily is of very simple construction and cannot readily get out of order; which allows of cloth running at high speeds being as effectively guided as cloth running at slow speeds, and which allows of ready adjustment to suit a variety of working conditions.

According to the present invention, a construction of automatic guider is provided characterized (*a*) by a pair of guide rollers for each edge or half width of the cloth, one roller of each pair being long and incapable of endwise adjustments and the other roller of each pair being short, and capable of being moved endwise bodily alongside the long roller (*b*) by an arrangement of operative elements or power units at points removed from said rollers and in the end frames of the guider, adapted to actuate the short rollers to hold them in close frictional contact with the long rollers, or allow same to lie out of contact therewith, and (*c*) a pair of feelers independently adjustable of the rollers and of each other and arranged to right and left of the cloth, and each feeler adapted to control one of the said operative elements under the action of the cloth, the feeler on one side controlling the operative element and short guide roller on the same side of the machine.

The invention will be fully described with the aid of the accompanying drawings, wherein:—

Fig. 1 and Fig. 1ª collectively illustrate a front elevation (partly broken away), and Fig. 2 and Fig. 2ª collectively illustrate a plan of one example of the improved cloth-guiding machine.

Figure 4:
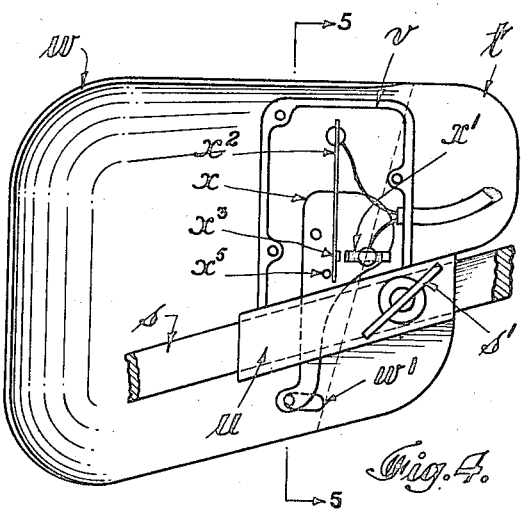
Fig. 4 illustrates an enlarged side elevation.
Figures 5, 6:
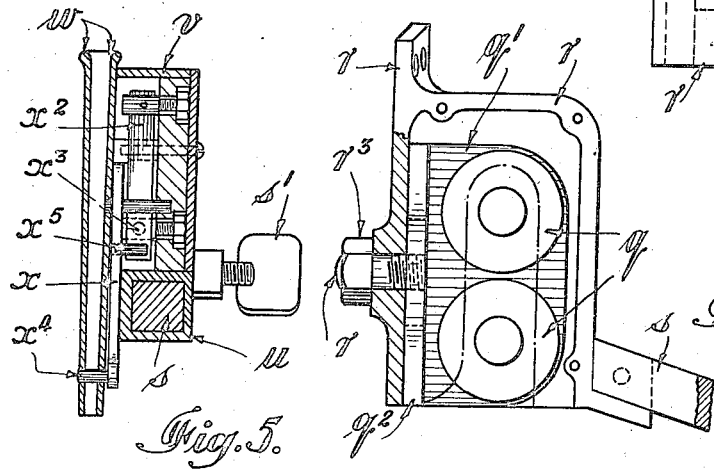

Fig. 5 a vertical cross section of the "feeler" mechanism on the line 5—5 of Figure 4.

Fig. 6 illustrates a part sectional end elevation, and

Figure 7:
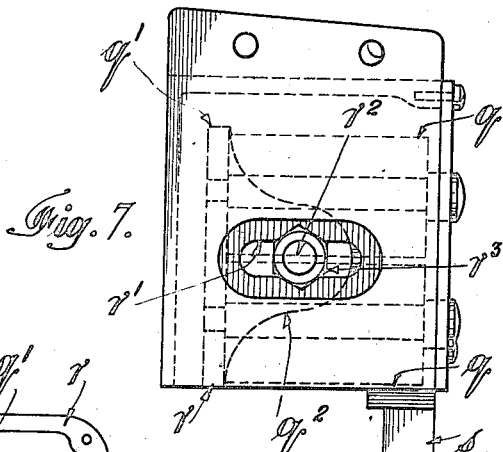

Fig. 7 a face view of one of the "power" units.

In carrying out the invention in one convenient form, the improved guider comprises a pair of end frames $a$, $a$ preferably built up of polished steel rods or tubes and hollow cast-iron cross heads and base plates, these latter being provided with bolts $b$, for holding the frames to the floor. Extending from frame to frame are rods or tubes $c$, $c$ which, in conjunction with adjustable clamps $d$, $d$, serve to connect one frame to the other, besides also serving to carry certain parts of the machine. A further tube $c^1$ also extends from frame to frame and helps to position the frames, said tube at one end being connected to one frame by means of an elbow member $c^2$, and at the other end being connected to the other frame by means of a T member $c^3$. To right and left of the centre of the machine and lying at an angle to the vertical (15° in the example shown) are arranged pairs of guide rollers, one roller $d^1$ of each pair being comparatively long and extending from near to the centre of the machine to near one of the end frames, and the other roller $e$ being comparatively short. The axis of each long roller $d^1$ is journaled at one end in ball and swivel bearings $f$ adjustably carried by a collar $g$ on one of the end frames, and at the other end said axis is journaled in similar ball and swivel bearings $h$ carried by a stud $i$ secured to a lug $j^1$ of a clamp $j$ on the rod $c$, see Figures 2 and 3. The short roller $e$ of each pair of rollers is carried by a tubular slide member $k$ having arms $k^1$ in the extremities of which the roller is journaled, said slide member $k$ being slidably mounted upon an inclined bar $l$. This bar and the slide member are rectangular in cross section. At one end each bar $l$ is rotatably mounted in a swivel bearing $m$ carried by a bracket $n$ clamped to the rod $c$ and at the other end said bar is rotatably mounted in a swivel bearing $o$ carried in the end frame of the machine.

To each bar $l$ is fitted the armature or keeper $p$ of an electro-magnet $q$ carried by the adjacent end frame. The magnet is housed in a casing $r$, see Figures 6 and 7, secured by bolts and nuts, or screwed studs to the upper cross member of the end frame. The magnet poles are mounted on a plate $q^1$ common to both and provided with a flange $q^2$ which lies parallel with the magnet poles. In one side of the casing $r$ is a horizontal slot $r^1$, through which a set stud $r^2$ on the flange $q^2$ passes, and supports the magnets within the casing at any desired point along the slot, a nut $r^3$ applied to the set stud serving to hold the magnet firmly in the adjusted position.

Figure 3:
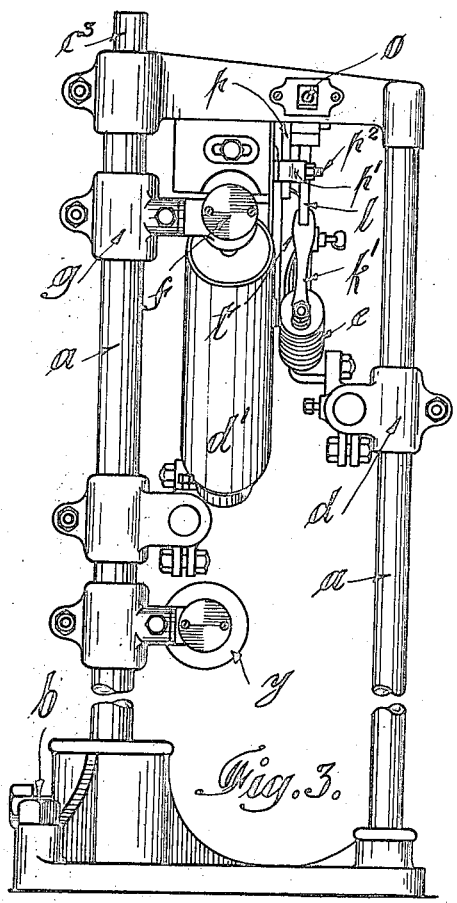
Fig. 3 illustrates a left hand end elevation of the same machine.

The position of each short roller $e$ when not acted upon by the power magnet is as shown in Figure 3, i. e: slightly away from the long roller $d^1$, but immediately the power magnet is energized and the armature $p$ is attracted by the poles of the magnet, the bar $l$ is given a partial rotation and the roller $e$ is held in close frictional contact with the long roller $d^1$, or the cloth lying between them. To limit the movements of the armature when moving away from the magnet poles, a small bracket $p^1$ and set screw $p^2$ are provided.

Each long roller $d^1$ will preferably be made of wood or of metal covered with a close-fitting sleeve of india-rubber or like material, and each short roller will preferably be made wholly of rubber or metal. The surfaces of the rollers are serrated, but they may be plain.

The purposes of the aforesaid horizontal adjustment of each magnet $q$ is to allow of the nip or pressure of the short roller against the long roller being varied, the greater the distance of the magnet from the armature, the greater the depression of the rubber and the greater the nip of the roller.

Upon further inclined bars $s, s$ are mounted feeler-levers carriers $t, t$ one for each edge of the cloth to be guided. The rods $s, s$ are parallel with rollers and the rods $l$. Each carrier, see Figures 4 and 5, comprises a tubular body part $u$ adapted to slidably fit its bar $s$, this latter and the part $u$ being rectangular in cross section. In one with said tubular part is an upstanding box-part $v$, adapted to enclose certain working parts, and at one side to support two thin metal plates $w, w$. These plates unite or lie close together on one vertical edge, see Figure 2, but at the opposite edge they lie apart and are flared outwards. When on its bar $s$, each feeler lever carrier lies with the outwardly flared edges of its plates facing the outwardly flared edges of the other carrier. By sliding the part $u$ along the bar $s$, each carrier can be moved to various positions along the bar and held in the adjusted position by a wing-headed set screw $s^1$.

Within the box-part $v$ of each carrier and extending down below the bar $s$ is pivotally mounted a feeler lever $x$, see Figures 4 and 5. Also within the box part $v$ is an electric switch consisting of a relatively fixed terminal contact $x^1$ and a spring blade $x^2$ carrying a further and movable contact $x^3$. At its lower end the feeler lever is provided with a pin $x^4$ which extends through slots $w^1$ in the plates $w, w$ and bridges the space between the plates, see Figure 2. Acting on a pin $x^5$ carried by the feeler lever, the spring blade $x^2$ holds the contacts $x^1, x^3$ normally apart and the pin $x^4$ at one end of the slots.

The said contacts $x^1$ and $x^3$ are in circuit with a relay magnet away from the machine, and when they are moved into contact with each other, the relay circuit is completed thereby causing the relay magnet to be energized and to break the circuit of one of the power magnets. The force required to make and break the relay or primary circuit is very small and with only a slight current required to operate the relay magnet, no sparking takes place at the switch when the primary circuit is broken. A condenser is preferably used with each relay magnet to prevent or minimize sparking.

A motor generator or dynamo may be used to supply current to the power magnets, or it may be supplied from a lighting main (where available), using a suitable transformer.

The leads from each feeler-lever switch pass to the end frame of the machine nearest to the switch. The leads to the power magnet at the right hand end of the machine pass through the cross tube $c^1$, the two sets of power magnet leads extending through the T-member $c^3$.

In proceeding to use the machine, the short rollers $e$ are each first adjusted along the bars $l$ to suit the width of the cloth to be guided and each feeler lever carrier $t, t$ is also adjusted along its bar $s$ to bring the feeler levers $x$ into close proximity to the edges of the cloth, and to positions in which it is desired the feeler levers shall be acted upon by the cloth. After being adjusted, the roller slides $h$ and feeler lever carriers $t, t$ are firmly secured to their respective bars by set screws.

With the cloth then delivered to the machine it is led vertically and centrally downwards between the pairs of guide rollers $d^1, e$, the edges of the cloth passing also between the outwardly flared plates $w, w$ of the feeler lever carriers. After passing between the rollers, the cloth is passed below the guide roller $y$ and finally to the machine into which the cloth requires to be guided. The electric current to the power magnets is then switched on, each power magnet having its own current.

With the machine started, and the cloth thereby caused to pass through the guider, it will be guided centrally and will also be spread or opened out to its full or desired width by the rollers. So long as the cloth travels in a straight path it will not operate upon either of the feeler levers $x$ and both pairs of rollers will grip the cloth. Should however, the cloth wander out of the straight it will operate upon one of the feeler levers, and pressing such feeler lever back will complete the circuit of one of the relay magnets. This latter will then break the circuit of the magnet acting on the short roller which grips the edge of the cloth acting on the feeler lever, whereupon such short roller instantly falls away from the cloth (see Figure 3), whilst the other short roller continues to grip the cloth and guides it back to its true path, the said relay circuit being broken and the circuit of the magnet being remade or completed when the cloth moves clear of the feeler.

Owing to the delicacy of the feeler lever movements and the quick action of the power magnets the gripping and releasing the cloth by the rollers is very rapid.

By employing relatively fixed long guide rollers and longitudinally adjustable short guide rollers, only one roller of each pair requires to be adjusted to suit varying widths of cloth; further, by making the feeler lever carriers adjustable independently of the short guide rollers, the latter can be caused to engage the cloth to varying degrees of the length of the roller. Owing to the use of relay magnets, and to the fact that the main power circuits are made and broken at points away from the machine, and owing also to the use of condensers, all sparking is removed from the machine and the danger of fire thereby considerably reduced, if not entirely eliminated.

Figure 1:
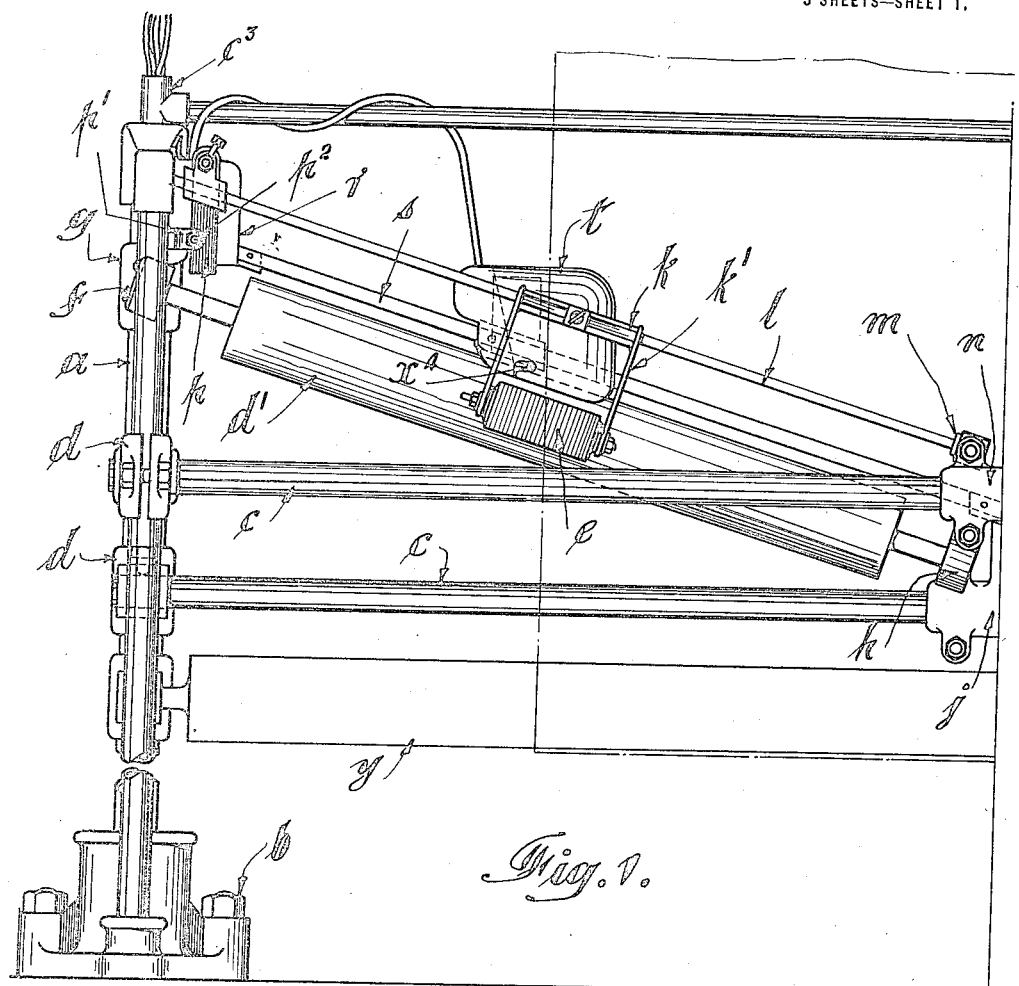
Figure 2:
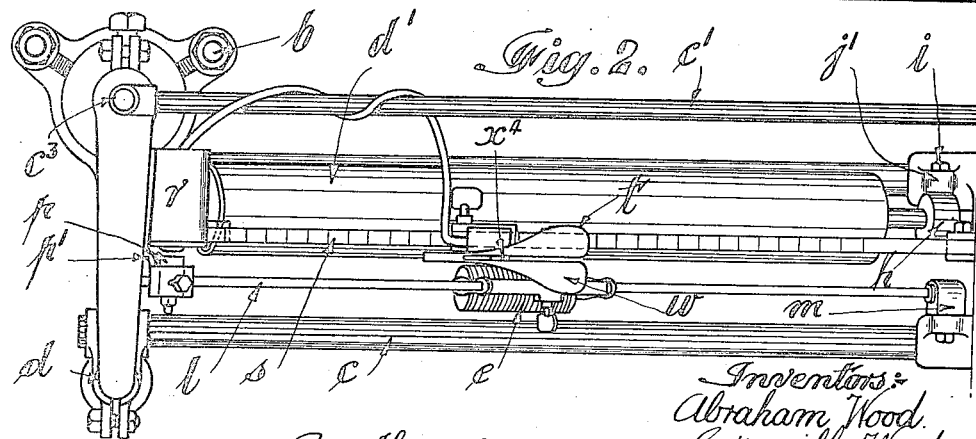

To facilitate the adjustment of the feeler lever carriers and short rollers, the bars may be calibrated in inches or other convenient measure, see Figures 2 and $2^a$.

A further advantage of the improved machine is that in order to prevent the uneven wear of the rollers, or that of say the bowl of a calendering machine, the rollers $d^1$, $e$ and the feeler lever carriers can be arranged so as to guide the cloth other than centrally into the machine.

What we claim is:—

1. An automatic cloth or like guiding machine comprising a pair of end frames and cross members connecting said frames, guide rollers supported by said end frames and cross members arranged in pairs and at an angle to each other and to right and left of the centre of the machine, one roller of each pair being long and the other short and the short roller being movable bodily into and out of peripheral contact with the long roller, fixed bearings for the long rollers, inclined bars to right and left of the centre of the machine respectively and a slide on each bar adjustable endwise thereon and carrying one of the said bodily movable short rollers, a power element at each end of the machine and means whereby said power element when in operation acts on the inclined bar to partially rotate the same and bring the short roller into contact with the long roller, further inclined bars to right and left of the centre of the machine respectively, feeler lever carriers and feeler levers independently adjustable along said bars, and means between each feeler lever and one of the power elements at the end of the machine, whereby, when the cloth acts on the feeler lever, said power element is caused to release the bodily movable roller at the same end of the machine, substantially as herein set forth.

2. In an automatic cloth or like guiding machine and in combination with pairs of guiding rollers to right and left of the centre of the machine, inclined bars parallel with said rollers, a feeler lever carrier on each of said bars, and independently adjustable along the bars and each carrier comprising an electric switch, a relay magnet for each feeler lever carrier controlled by said switch, and two independent electromagnets, one at each end of the machine controlled by the respective relay magnets, substantially as herein set forth.

3. In an automatic cloth or like guiding machine, and in combination with pairs of guiding rollers to right and left of the centre of the machine, inclined bars parallel with said rollers, feeler lever carriers slidably mounted on said inclined bars, and means for fixing same on said bars at any desired point, each carrier consisting of a tubular member, a box-part secured thereto and two thin metal plates carried by the box-part, said plates being united or connected to each other on one vertical edge, and at the other edge separated and flared outwardly, a feeler lever pivotally mounted inside the said box-part and having a pin or peg extending through slots in said plates and bridging the space between the plates, substantially as herein set forth.

4. In an automatic cloth or like guiding machine, end frames and cross members connecting said frames, pairs of rollers supported by said frames and cross members, arranged at an angle to each other and to right and left of the centre of the machine one roller of each pair being long and incapable of endwise movement and the other roller being short and capable of bodily movement in a direction parallel with the axis of the long roller, bars parallel with the long rollers and each rotatably mounted in bearings at both ends, a slide member on each bar carrying one of the short rollers, and means whereby each of said bars may be moved angularly to bring the short roller into and out of contact with the long roller, substantially as herein set forth.

5. In an automatic cloth or like guiding machine, end frames and cross members connecting said frames, pairs of rollers supported by said frames and cross members arranged at an angle to each other and to right and left of the centre of the machine, one roller of each pair being long and incapable of endwise movement and the other roller being short and capable of bodily movement in a direction parallel with the axis of the long roller, bars parallel with the long rollers and each rotatably mounted in bearings at both ends, a slide member on each bar carrying one of the short rollers, electro-magnets adjustably supported on the end frames, and armatures or "keepers" secured to the bars carrying the short roller slide members, substantially as herein set forth.

In testimony whereof they have signed their name to this specification.

ABRAHAM WOOD.
GRANVILLE WOOD.